Patented May 7, 1935

2,000,393

UNITED STATES PATENT OFFICE 2,000,393

METHOD OF DYEING NITROCELLULOSE LACQUERS

Wolfgang Jaeck, Basel, Switzerland, assignor to the firm of Society of Chemical Industry in Basle, Basel, Switzerland No Drawing. Application May 12, 1932, Serial No. 610,981. In Switzerland May 28, 1931

3 Claims. (Cl. 134—79)

It is known that both dyestuffs soluble in alcohol, and dyestuffs which are insoluble in water and in alcohol, find application for coloring lacquers, varnishes, plastic masses having a basis of natural or artificial resins, and the like. Dyestuffs soluble in alcohol are for instance basic dyestuffs, sulfonated or unsulfonated azo-dyestuffs and anthraquinone dyestuffs and their metal compounds, azines, oxazines, pyronines, whereas dyestuffs which are insoluble in water and in alcohol are for instance indigoid and anthraquinonoid vat dyestuffs, the sulfur dyestuffs, also the azo-dyestuffs known as pigments, such as, for example, the barium salt of the azo-dyestuff from 2-naphthylamine-1-sulfonic acid and β-naphthol or the azo-dyestuff from acetoacetanilide and 2-nitro-4-methyl-1-aminobenzene; also basic dyestuffs which have been precipitated with complex phosphotungstic or phospho-molybdic acids, inorganic pigments such as, for example, permanganates precipitated on a barium sulphate basis; and finally mineral pigments, such as Berlin Blue, Umber, Ochre and the like.

The dyestuffs which are applicable for these purposes naturally cannot be brought to a desired strength by means of the usual diluents, such as Glauber salt or common salt, since these inorganic compounds are not soluble in the solvents used for lacquers or varnishes, and in the solvents used for dissolving plastic natural and artificial resins, or in the plastic natural and artificial resins themselves.

It has now been found that the amides of organic acids, which are sparingly soluble or insoluble in water but easily soluble in alcohol, are quite generally suited as diluents for adjusting the strength of dyestuffs suitable for coloring lacquers, varnishes and plastic masses having a basis of natural or artificial resins, and the like, which latter being for instance in the form of molding powders or of solutions. Such amides of organic acids (sulfonic or carboxylic acids) are for instance benzene-sulfamide, ortho- and para-toluene-sulfamide, toluene-2:4-disulfamide, chlorobenzene-sulfamide, toluene-sulfanilide, benzene-sulfomethylamide, α-naphthalene-sulfamide, β-naphthalene-sulfanilide, naphthalene-disulfamide, acetanilide, acetoacetic anilide, stearic acid amide, palmitic acid anilide, oleic acid amide, benzamide, benzanilide, α- or β-naphthoic acid amide, α- or β-naphthoic acid anilide.

These organic acid amides are easily accessible; moreover their presence in lacquers, varnishes and the like is not detrimental. As compared with other organic compounds which have already been recommended as additions for adjusting the strength of dyestuffs, such as dextrin, the organic acid amides have the advantage that they dissolve without turbidity in the solvents which come into question, or in the plastic masses having a basis of natural or artificial resins. Further, the organic acid amides do not crystallize in the lacquer coating during the drying, and in the production of molded articles from plastic natural or artificial resins, and the like, and they permit the production of coatings which are quite free from cloudiness.

The following examples illustrate the invention; the parts being by weight unless otherwise stated; the relationship between parts by weight and parts by volume is that which exists between a kilogramme and a litre:—

Example 1

4 parts of the pure dyestuff known under the name Auramine (compare Colour Index No. 655) are intimately mixed with one part of para-toluene sulfamide and the mixture is dissolved with the aid of heat in 100 parts of a commercial nitrocellulose lacquer, containing besides nitrocellulose principally ethyl acetate, butyl acetate, ethyl alcohol and tricresyl phosphate. The solution thus prepared may be applied to metal articles such as aluminium sheets, for example by spraying or painting; there are thus obtained yellow coatings which remain completely pure and transparent.

Example 2

40 parts of the dyestuff obtainable by coupling diazobenzene with the 3-methyl-5-pyrazolone obtained from 1-amino-2-chloro-benzene-5-sulfonic acid are mixed with 5 parts of para-toluene sulfamide. The mixture is dissolved, advantageously whilst heating and stirring in 1000 parts by volume of a commercial spirit varnish consisting principally of a natural resin and alcohol. The solution may be used for printing large surfaces of aluminium paper in a rotary machine; after drying there are obtained colored prints which are free from cloudiness and are distinguished by very good fastness to light. Remarkably fast to light are also the coatings obtained by means of the aforesaid dyestuff and a nitrocellulose lacquer.

Example 3

9 parts of 4'-nitro-4-aminoazo-benzene are mixed with 1 part of para-toluene sulfamide and the mixture is dissolved in 100 parts by volume of an alcoholic solution of a condensation product from a phenol and formaldehyde. Transparent paper is impregnated with the solution thus obtained, dried and subject to polymerization for 8 hours at 60° C. There is thus obtained a paper which is colored a uniform orange-brown and is completely free from cloudiness.

*Example 4*

45 parts of 1-amino-4-anilido-anthraquinone are mixed with 5 parts of para-toluene sulfamide and the dyestuff thus adulterated is dissolved in an alcoholic spirit varnish. By immersion in or spraying with this solution, objects of wood can be provided with transparent blue coatings completely free from cloudiness.

Instead of the dyestuff named in this example there may be used a metal compound of a dyestuff, such as those obtainable as described in French specification No. 634,457 or in British specification No. 293,358, or a dyestuff having quite a different constitution, such as an azine dyestuff referred to in U. S. Patent 940,354.

*Example 5*

40 parts of the sodium salt of 3:6-diphenyl-naphthophenosafranine-2:7-disulfonic acid are intimately mixed with 5 parts of para-toluene sulfamide and the mixture is dissolved whilst heating in 1000 parts by volume of a commercial nitrocellulose lacquer as described in Example 1. Metal articles, such as aluminium sheets, may be coated by spraying or painting with the solution thus obtained, whereby there are produced transparent vivid blue coatings of very good fastness to light.

*Example 6*

40 parts of the unsymmetrical urea from 4-amino-4'-hydroxyazo-benzene-3'-carboxylic acid and 4-amino-3-methoxyazo-benzene-3'-sulfonic acid are intimately mixed with 2.5 parts of para-toluene-sulfamide and the mixture is dissolved whilst heating in 1000 parts by volume of a commercial nitrocellulose lacquer. Articles of metal or wood can be provided, by spraying or painting them with the solution thus obtained, with vivid yellow coatings which remain completely free from cloudiness.

*Example 7*

100 parts of N-dihydro-1:2:1':2'-anthraquinoneazine-3:3'-dicarboxylic acid are intimately mixed with 20 parts of para-toluene-sulfamide in a ball mill. The mixture is then made into a paste with 100 parts of tri-cresyl-phosphate and 300 parts of butyl alcohol in a wet color mill; as soon as the dyestuff has become well distributed 1000 parts of a commercial "Zapon" varnish are added and the whole is further ground. The thin paste thus obtained is then diluted to a desired concentration by addition of a nitrocellulose lacquer. The suspension thus obtained may be applied by immersion, spraying or painting to surfaces of metal, leather, wood and the like, whereby there are obtained vivid, glazed, colored coatings which remain completely free from cloudiness.

*Example 8*

100 parts of 4:4'-dimethyl-6:6'-dichloro-2:2'-bisthionaphthene-indigo are mixed with 10 parts of para-toluene sulfamide as described in Example 7; the mixture is then converted into a paste with butyl alcohol and tricresyl-phosphate and there is added to the paste a commercial "Zapon" varnish. By dilution with a nitrocellulose lacquer there is obtained a suspension which can be applied by spraying, painting or immersion to articles of metal or wood, which are thereby provided with vivid rose-colored glazed coatings which remain completely free from cloudiness.

Finely ground Berlin Blue can be mixed with para-toluene sulfamide and dispersed in a "Zapon" varnish in the same manner as that indicated in the preceding paragraph. The suspension thus obtained likewise yields films which are free from cloudiness and are colored vivid blue.

*Example 9*

30 parts of a condensation product from phenol and formaldehyde, 1 part of the barium salt of the azo-dyestuff from 2-napththylamine-1-sulfonic acid and $\beta$-naphthol which has been adjusted by admixture with 0.1 part of para-toluene sulfamide, 5 parts of titanium dioxide and 14 parts of asbestos or saw-dust are mixed together at 60–70° C. in a kneading machine. The paste thus obtained is powdered, subjected to a preliminary hardening at 60–70° C. and finally pressed for several minutes at 150° C. under a pressure of 150 kilos per sq. cm. There is obtained an intensely red moulded article which remains completely free from spots and has a very low electrical conductivity.

I claim:

1. The method of dyeing a nitrocellulose lacquer which consists in admixing a dyestuff suitable for dyeing such lacquer with a color adjusting agent consisting of an aryl-sulfamide, and then dissolving the resultant admixture by means of heat in the nitrocellulose lacquer.

2. The method of dyeing a nitrocellulose lacquer which consists in admixing a dyestuff suitable for dyeing such lacquer with a color adjusting agent consisting of a benzene-sulfamide, and then dissolving the resulant admixture by means of heat in the nitrocellulose lacquer.

3. The method of dyeing a nitrocellulose lacquer which consists in admixing a dyestuff suitable for dyeing such lacquer with a color adjusting agent consisting of para-toluene sulfamide, and then dissolving the resultant admixture by means of heat in the nitrocellulose lacquer.

WOLFGANG JAECK.